United States Patent [19]

Kakino et al.

[11] Patent Number: 5,087,281
[45] Date of Patent: Feb. 11, 1992

[54] MOLD FOR FORMING CURVED WINDOW GLASS WITH DEEPLY BENT END PORTIONS

[75] Inventors: Mineo Kakino, Hisai; Masami Nishitani, Mie, both of Japan

[73] Assignee: Central Glass Company, Limited, Ube, Japan

[21] Appl. No.: 525,722

[22] Filed: May 21, 1990

[30] Foreign Application Priority Data

May 22, 1989 [JP] Japan ................................. 1-58137

[51] Int. Cl.⁵ ............................................ C03B 23/027
[52] U.S. Cl. .................................... 65/290; 65/291
[58] Field of Search ................... 65/287, 289, 290, 291

[56] References Cited

U.S. PATENT DOCUMENTS 3,220,819 11/1965 Jendrisak ............................ 65/290
4,597,789 7/1986 Reese .................................. 65/287

Primary Examiner—Joye L. Woodard
Attorney, Agent, or Firm—Fleit, Jacobson, Cohn, Price, Holman & Stern

[57] ABSTRACT

A mold for forming a curved window glass with deeply bent end portions includes a stationary main frame for forming a gently curved main portion of the window glass and a pair of swingable side frames for forming the deeply bent end portions. A weight plate is installed on each side frame so as to be movable toward and away from same. A plurality of pushing members are installed on the weight plate and alignable with corresponding ones of supporting members for supporting the glass plate on the side frame. The pushing members are constructed and arranged so as to contact with only an edge of a lateral end of the glass plate.

8 Claims, 2 Drawing Sheets

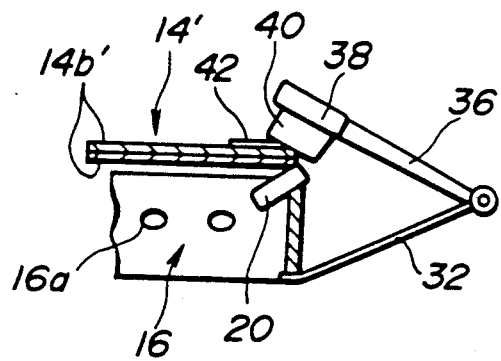
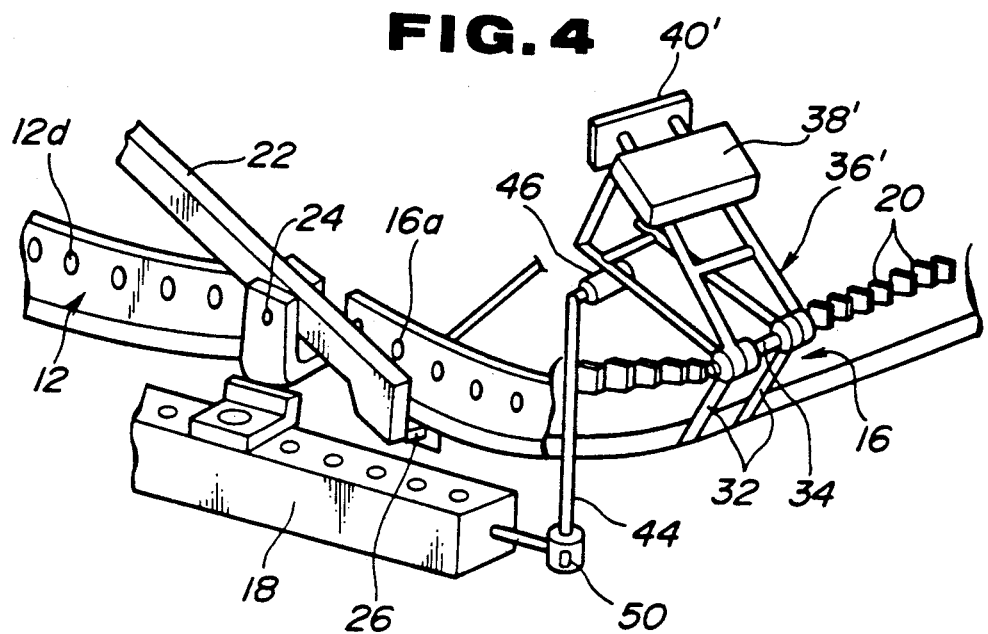
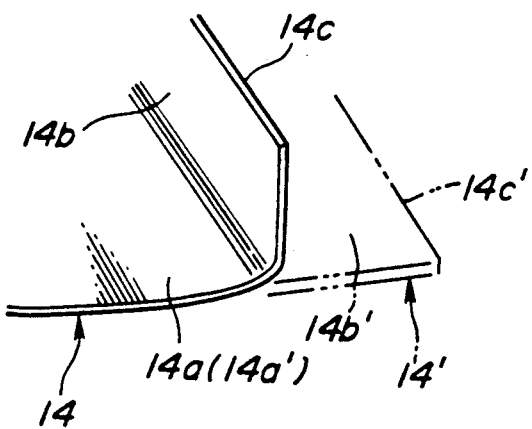

MOLD FOR FORMING CURVED WINDOW GLASS WITH DEEPLY BENT END PORTIONS

BACKGROUND OF THE INVENTION

1. Field of the Invention

The present invention relates to a mold for forming a curved window glass with deeply bent end portions for use as a windshield or rear window of an automobile, etc.

2. Description of the Prior Art

A curved window glass for an automobile has heretofore been produced by heating a glass plate held on a mold into a softened state and allowing it to bend after the curved surface of the mold by the weight of the glass plate of itself.

Recently, it has been desired such a window glass for use as a windshield or a rear window of an automobile that has a gently curved main central portion and opposite end portions deeply bent with a small radius of bend, i.e., sharply and nearly at right angles to the main central portion with a view to increasing the visual range and thereby assuring the safety while improving the riding comfort of the vehicle. The deeply bent end portions are herein used as indicating the end portions of a considerable extension away from the the main central portion (i.e., not shallow).

As disclosed in Japanese Patent No. 58-5851 assigned to the same assignee as this application, a prior art mold for forming a curved window glass with deeply bent end portions is known in which side frames are linked to a stationary main frame in such a manner that each side frame turns in response to a turn of a lever with a weight by an angle larger than that of the lever.

It is also known as disclosed in Japanese Utility Model No. 63-44434 a mold in which side frames are movable toward and away from the main frame and provided with stoppers held engaged with the lateral edges of a glass plate with a view to attaining a symmetrical and therefore dimensional accuracy of the product.

A problem of the former prior art mold is that the glass plate in a heated, softened state is liable to bend or displace upwards away from the mold at the opposite lateral end portions since the lateral end portions are light in weight and therefore lack the pushing forces thereon. Further, in case of a glass plate having a black enamelled peripheral portion for forming a vehicle window glass, the lateral end portions are liable to bend downwards after the upward displacement due to the difference in heat absorption between the black enamelled portion and the transparent portion next thereto.

With the latter prior art mold, the above described upward bending or displacement phenomenon of occurs and cannot be prevented.

SUMMARY OF THE INVENTION

In accordance with the present invention, there is provided an improved mold for forming a curved glass with opposite bent end portions. The mold comprises a stationary main frame, a pair of side frames pivotally connected to opposite ends of the main frame, supporting means provided to at least one of the side frames for supporting thereon a glass plate, weight plate means installed on the one side frame so as to be movable toward and away from the supporting means, and pushing means installed on the weight plate means in such a manner as to be capable of being positioned right above the supporting means and contacting with only an upper edge of an end of the glass plate held in place on the supporting means.

The above structure is effective for overcoming the above noted problems inherent in the prior art molds.

It is accordingly an object of the present invention to provide a mold for forming a curved window glass with deeply bent end portions which can prevent the above noted upward bending phenomenon of the lateral end portions of the glass plate assuredly and efficiently.

It is another object of the present invention to provide a mold of the above described character which can reduce the percent defective with efficiency.

It is a further object of the present invention to provide a mold of the above described character which can efficiently prevent flaws or the like from being caused at the black enamelled peripheral portion of the window glass.

BRIEF DESCRIPTION OF THE DRAWINGS

FIG. 3 is a sectional view taken along the line III—III of FIG. 2;

FIG. 4 is a view smaller to FIG. 2 but shows another embodiment of the present invention; and FIG. 5 is a fragmentary perspective view of a curved glass with deeply bent end portions for use as a windshield or rear window of an automobile.

DESCRIPTION OF THE PREFERRED EMBODIMENTS

Figure 1:
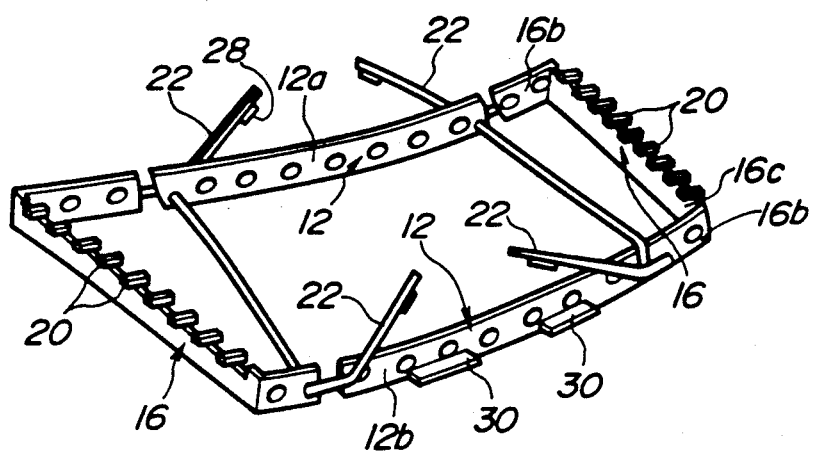
FIG. 1 is a perspective view of a mold for forming a curved window glass with deeply bent end portions, to which the present invention is applicable.
Figure 2:
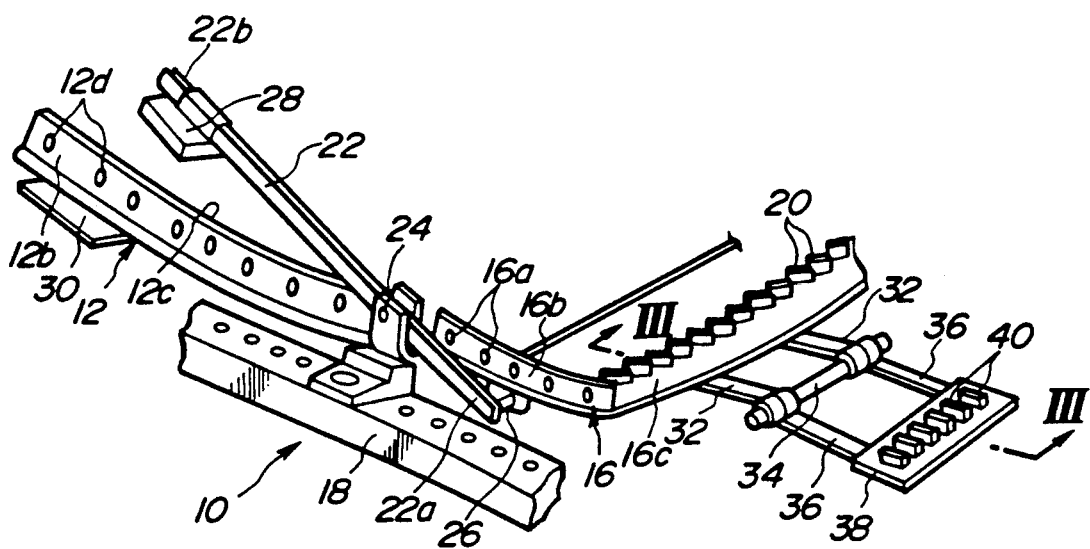
FIG. 2 is an enlarged perspective view of a novel important portion of a mold for forming a curved window glass with deeply bent end portions according to an embodiment of the present invention.

Referring to FIGS. 1 to 4 in which like or corresponding parts and portions are designated by the same reference characters, a mold according to an embodiment of the present invention is generally designated by the reference numeral 10 and includes a stationary main central frame 12 for forming a gently curved main central portion 14a of a window glass 14 as a vehicle windowshield or rear window and a pair of swingable side frames 16 at the opposide ends of the main frame 12 for forming deeply bent end portions 14b of the window glass 14. The frames 12 and 16 are carried by a molding truck 18 for transfer into and out of a heating furnace (not shown).

The main frame 12 consists of a pair of frame sections 12a and 12b made up of a strip of plate or plural strips of plates and adapted to support a main central portion 14a' of a glass plate 14' at locations adjacent the opposite edges thereof, i.e., the upper and lower edges in use. The frame sections 12a and 12b have on the upper edges thereof curved surfaces 12c after which the glass plate 14' is shaped when heated into a softened state. Further, the frame sections 12a and 12b are adapted so as to attain thermal balance between the glass plate 14' and the metal frame 12 at the time of cooling thereof and formed with a plurality of holes 12d for reduction of the weight.

The side frames 16 are swingably or pivotally connected to the opposite ends of the main frame 12, i.e., the opposite longitudinal ends of the frame sections 12a and 12b in such a way as to constitute a trapezoindal shape. The side frames 16 are channel-shaped and formed with a plurality of holes 16a for reduction of the weight. Each channel-shaped side frame 16 has a pair of parallel end frame sections 16b alignable with the respective frame sections 12a and 12b of the main frame 12 and an intermediate frame section 16c between the end frame sections 16b.

The side frames 16 are further provided with a plurality of supporting members 20 on the upper edges of the intermediate frame section 16c for supporting thereon lateral end protions 14b' of the glass plate 14'. The supporting members 20 are made up of small pieces of plates and arranged in an array like a comb in the longitudinal direction of the intermediate frame section 16c.

Two pairs of levers 22 are provivded for urging the respective side frames 16 to turn in predetermined directions relative to the main frame 12. To this end, each lever 22 is disposed on the side of the end frame section 16b of corresponding one of the side frames 16 and pivotally installed at an intermediate portion thereof on the main frame 12 by means of a pivot 24 in such a way as to be swingable in a plane substantially perpendiuclar to the plane on which the glass plate 14 is placed upon installation on the mold 10. Each lever 22 has longitudinal ends 22a and 22b on the opposite sides of the pivot 24 and is secured, at one end 22a, i.e., at the lower end 22a located nearer the side frame 16, to the side frame 16 by way of a connecting pin 26. At the other end 22b, i.e., at the upper end 22b located remoter from the side frame 16 each lever 22 has a weight 28. Each lever 22 is abuttingly engageable, at the end 22b with the weight 28, with a stopper 30 secured to the main frame 12 to stop turning or swinging when the end 22b moves down a predetermined distance, i.e., when the lever 22 turns a predetermined angle while driving the corresponding side frame 16 to turn a predetermined angle.

The intermediate frame section 16c of each side frame 16 has at the lower edge a pair of parallel brackets 32 extending outwards therefrom in the longitudinal direction of the mold 10, i.e., in the direction substantially normal to the longitudinal direction of the intermediate frame section 16c. The brackets 32 have installed at the free ends thereof a pivot 34 on which a pair of parallel arms 36 are pivotally installed at one ends thereof. The arms 36 have secured thereto at the other ends a rectangular weight plate 38 in substantially parallel to the intermediate frame section 16c. A plurality of pushing members 40 in the form of small pieces of plates are installed on the weight plate 38 in an array like a comb in the longitudinal direction thereof. The pushing members 40 are alignable with the corresponding support members 20 when the arms 36 and the weight plate 38 are turned to place the pushing mebers 40 adjacent the supporting members 20.

More specifically, the pushing members 40 and the support members 20 are constructed and arranged so that the pushing members 40, as will be understood from FIG. 3, are abuttingly engageable or capable of contacting at the flat surfaces thereof with the corner or angled portions of the supporting members 20 if the glass plate 14' is not interposed therebetween, that is, the support members 20 are abuttingly engageable or capable of contacting with only the edge of the corresponding lateral end 14c' of the glass plate 14' when the glass plate 14' is to be processed by the mold 10. This is attained by suitably determining the angle between the brackets 32 and the side frame 16, the lengths of the brackets 32 and the arms 36. Once those are designed suitably, the pushing members 40 are constantly held in contact with the edge of the corresponding lateral end 14c' of the glass plate 14' irrespective of turn of the side frame 16.

In production of the curved window glass 14 with deeply bent end portions 14b, this invention operates as follows.

The flat or planar glass plate 14' is installed on the mold 10 in such a manner that the the lateral end portions 14b' of the glass plate 14' are clamped between the pushing members 40 and the supporting members 20 by bringing the pushing members 40 in contact with the upper edges of the lateral ends 14c' of the glass plate 14'. The mold 10 and the glass plate 14' held thereon in the above manner is transferred into a heating furnace heated up to a glass softening temperature or so.

As the glass plate 14' is softened increasingly, the levers 22 turn in such a way as to allow the ends 22b with the weights 28 to go downwards gradually while driving the side frames 16 to turn upwards about the axes of turn or oscilation thereof for thereby sharply bending the lateral end portions 14b' of the glass plate 14'. The levers 22 stop turning when the ends 22b with the weights 28 abut upon the stoppers 30, whereby to finish bending of the lateral end portions 14b' of the glass plate 14'. The lateral end portions 14b' are thus bent nearly at right angles to the main central portion 14a'. In this instance, the main central portion 14a' of the glass plate 14' is formed after the curved surfaces 12c of the main frame 12 and therefor into a predetermined curved shape.

When the main central portion 14a' is formed after the shape of the main frame 12 and into a curved shape, the glass plate 14' is drawn inwardly of the mold 10 and thus tends to bend or displace upwards away from the mold 10 at and adjacent the lateral ends 14c' of the glass plate 14' due to an insufficient of weight of theremselves. This phenomenon is overcome by the mold 10 of this invention. That is, with the mold 10, a load is applied from the weight plate 38 to the lateral ends 14c' of the glass plate 14' for thereby pushing the same against the supporting members 20, thus preventing the upward bending phenomenon of the lateral end protions 14b' and therefore the downward bending phenomenon of the black enamelled peripheral portion.

The pushing members 40 are adapted to abut at the flat surfaces thereof upon the upper edges of the lateral ends 14c' of the glass plate 14' held on the supporting members 20, i.e., adapted to contact with only the upper edges of the lateral ends 14c' of the glass plate 14' whereby the peripheral black enamel 42 of the glass plate 14' is assuredly prevented from being damaged. Further, it is assuredly prevented a kink phenomenon at the lateral ends 14c' of the glass plate 14'. Accordingly, it becomes possible that a slight movement of the glass plate 14' on the supporting members 16 can be absorbed by a corresonding turn of the weight plate 36 and the arms 34, thus not causing any defect to the product.

The mold 10 of this invention can of course be used for forming a curved window glass 14 without any peripheral black enamel to prevent the upward bending phenomenon of the lateral end portions 14b' of the glass plate 14' due to the light weight of themselves. The mold 10 can be further used for a laminated glass plate.

FIG. 4 shows a modified embodiment in which an arm 36' has a wedge-like configuration and pivotally installed at an apex thereof on the pivot 34. The arm 36' has first and second sides meeting at the apex and installs at the first side a weight plate 38' and a pushing plate 40'. A post 44 is installed on the molding truck 18 and has at an upper end a roller 46 for contact with the second side of the arm 36'. The roller 46 is adjustable in position by means of a screw 50 such that the arm 36' turns about the pivot 34 in response to a turn of the corresponding side frame 16.

In operation, a turn of the side frame 16 causes the pivot 34 to go upwards, thus causing the arm 36' to turn about the point of support on the roller 46 and therefore the pushing plate 40' to turn downwards about the above described point of support.

That is, at the begining of the forming process of the glass plate 14' the pushing plate 40' is held apart from the upper edge of the corresponding lateral end portion 14b' of the glass plate 14' and goes nearer thereto as the lateral end portion 14b' of the glass plate 14' is bent increasingly to finally contact the same. Then, the succesive upward movement of the pivot 34 causes the arm 36' to turn about the point at which the pushing plate 40' abuts upon the edge of the glass plate 14' and thus allow the arm 36' plate 14' to go apart from the roller 46. As a result, a load mainly from the weight plate 38' is applied to the edge of the lateral end portion 14b' of the glass plate 14' for thereby preventing the same from displacing upwards away from the side frame 16 of the mold 10.

To hold the pushing plate 40' away from the glass plate 14' at the begining of the forming process is effective for protecting the edges of the glass plate 14 from the vibrations of the mold truck 18 during transfer thereof and further makes it possible to prevent the coloring of the enamelled periphery of the glass plate 14' form being damaged during heating. Further, the pushing plate 40' is brought into contact with the edge of the glass plate 14' without applying any impact upon the edge of the glass plate 14' since the pushing plate 40' goes nearer to the glass plate 14' as the glass plate 14' is bent increasingly. Afther the pushing plate 40' is once brought into contact with the edge of the glass plate 14', it turns together with the glass plate 14' supported on the supporting members 20, thus not causing any flaws on the glass plate 14'.

The angle at which the pushing plate 40 is brought into contact with the edge of the glass plate.. 14' is determined by the lengths of the brackets 32', arms 36', etc. and the angle between the pushing plate 40' and the arms 36'.

What is claimed is:

1. A mold for forming a curved glass with opposite bent end portions, comprising:
   a stationary main frame;
   a pair of side frames pivotally connected to opposite ends of said main frame;
   supporting means provided on at least one of said side frames for supporting thereon a glass plate;
   weight plate means installed on said one side frame so as to be movable toward and away from said supporting means; and
   pushing means installed on said weight plate means in such a manner as to be capable of being positioned right above said supporting means and contacting with only an upper peripheral edge of the glass plate held in place on said supporting means, said upper peripheral edge forming a junction between an upper surface and a side surface of the glass plate.

2. A mold for forming a curved glass with opposite bent end portions, comprising:
   a stationary main frame;
   a pair of side frames pivotally connected to opposite ends of said main frame;
   supporting means provided on at least one of said side frames for supporting thereon a glass pate;
   a bracket secured to said one side frame to project outwardly therefrom;
   an arm pivotally installed at a first end on said bracket and having a second end spaced apart from said bracket;
   a weight plate installed on said second end of said arm; and
   pushing means installed on said weight plate in such a manner as to be capable of being positioned right above said supporting means and contacting with only an upper peripheral edge of the glass plate held in place on said supporting means, said upper peripheral edge forming a junction between an upper surface and a side surface of the glass plate.

3. A mold for forming a curved glass with opposite bent end portions, comprising:
   a stationary main frame;
   a pair of side frames pivotally connected to opposite ends of said main frame;
   supporting means provided on at least one of said side frames for supporting thereon a glass plate;
   a bracket secured to said one side frame to project outwardly therefrom;
   an arm pivotally installed at a first end on said bracket and having a second end spaced apart from said bracket;
   a weight plate installed on said second end of said arm; and
   pushing means installed on said weight plate in such a manner as to be capable of being positioned right above said supporting means and contacting with only an upper peripheral edge of the glass plate held in place on said supporting means;
   said one side frame being channel-shaped and includes opposite end sections and an intermediate section therebetween;
   said supporting means including a plurality of supporting members in the form of pieces of plates arranged in a comb-like array in the direction of said intermediate section of said one side frame;
   said pushing means including a plurality of pushing members in the form of pieces of plates arranged in a comb-like array on said weight plate so as to be alignable with corresponding ones of said supporting members, respectively.

4. The mold as claimed in claim 3 wherein each of said pushing members has a flat surface and is capable of contacting with a corner of corresponding one of said supporting members when the glass plate is removed from the place therebetween.

5. The mold as claimed in claim 4 wherein said bracket and said arm are constructed and arranged so that said weight plate is movable in parallel toward and away form said intermediate section of said one side frame.

6. The mold as claimed in claim 3 wherein said main frame and said side frames are installed on a molding truck.

7. The mold as claimed in claim 3, further comprising lever means for driving said side frames to turn in predetermined directions when the glass plate is heated into a softened state.

8. A mold for forming a curved glass with opposite bent end portions, comprising:
a stationary main frame;
a pair of side frames pivotally connected to opposite ends of said main frame;
supporting means provided on at least one of said side frames for supporting thereon a glass plate;
a bracket secured to said one side frame to project outwardly therefrom;
an arm pivotally installed at a first end on said bracket and having a second end spaced apart from said bracket;
a weight plate installed on said second end of said arm;
pushing means installed on said weight plate in such a manner as to be capable of being positioned right above said supporting means and contacting with only an upper peripheral edge of the glass plate held in place on said supporting means;
said main frame and said side frame being installed on a molding truck; and
a roller supported on said molding truck and arranged in such a manner as to support said bracket at a portion intermediate between said longitudinal ends to hold said pushing means apart form the upper peripheral edge of the glass plate when an angle of turn of said one side frame relative to said main frame at the time of bending of the end portions of the glass plate is smaller than a predetermined value and be disengaged from said bracket to allow said pushing means to contact the upper peripheral edge of the glass plate when said angle of turn of said one side frame increases beyond said predetermined value.

* * * * *